United States Patent
Sanglikar et al.

(10) Patent No.: US 7,145,302 B2
(45) Date of Patent: Dec. 5, 2006

(54) METHOD AND APPARATUS FOR DRIVING A BRUSHLESS DIRECT CURRENT MOTOR

(75) Inventors: Amit Raja Sanglikar, Bangalore (IN); Herman Lucas Norbert Wiegman, Schenectady, NY (US); Charles Michael Stephens, Pattersonville, NY (US); Sunit Kumar Saxena, Aligarh (IN); Pradeep Vijayan, Bangalore (IN); Ajit Wasant Kane, Bangalore (IN)

(73) Assignee: General Electric Company, Niskayuna, NY (US)

( * ) Notice: Subject to any disclaimer, the term of this patent is extended or adjusted under 35 U.S.C. 154(b) by 191 days.

(21) Appl. No.: 10/818,401

(22) Filed: Apr. 6, 2004

(65) Prior Publication Data

US 2005/0218849 A1    Oct. 6, 2005

(51) Int. Cl.
*H02P 25/12* (2006.01)
*H02K 13/00* (2006.01)
(52) U.S. Cl. ............... 318/439; 318/245; 318/254; 318/434
(58) Field of Classification Search ......... 318/245, 318/254, 439, 434
See application file for complete search history.

(56) References Cited

U.S. PATENT DOCUMENTS

| | | | | |
|---|---|---|---|---|
| 5,552,689 A | * | 9/1996 | Matoba | 318/599 |
| 5,557,182 A | * | 9/1996 | Hollenbeck et al. | 318/432 |
| 5,675,231 A | * | 10/1997 | Becerra et al. | 318/801 |
| 5,723,967 A | * | 3/1998 | Hongo et al. | 318/254 |
| 5,804,939 A | * | 9/1998 | Yamai et al. | 318/439 |
| 5,838,127 A | * | 11/1998 | Young et al. | 318/293 |
| 5,986,419 A | * | 11/1999 | Archer et al. | 318/254 |
| 5,994,869 A | * | 11/1999 | Becerra | 318/729 |
| 6,657,412 B1 | | 12/2003 | Ishida et al. | |
| 6,670,785 B1 | | 12/2003 | Liang et al. | |
| 6,671,459 B1 | | 12/2003 | Bultman | |
| 2004/0046515 A1 | * | 3/2004 | Koski | 318/90 |
| 2004/0189221 A1 | * | 9/2004 | Kurosawa et al. | 318/254 |
| 2005/0063684 A1 | * | 3/2005 | Moser | 388/804 |
| 2005/0154545 A1 | * | 7/2005 | Ramu et al. | 702/65 |

* cited by examiner

*Primary Examiner*—Paul Ip
(74) *Attorney, Agent, or Firm*—Jason K. Klindtworth; Jean K. Testa

(57) ABSTRACT

A method for driving a DC motor includes generating a first voltage pulse, based on a pre-determined speed input and duty cycle, and configured to generate motor current of reference current value sufficient to achieve a desired speed according to the speed input. Subsequent pulses of the voltage are generated to maintain the current substantially within a range of the reference current. Another method includes sensing and comparing motor current to reference current value and generating an error signal therebetween, which is integrated over time to generate an integrated current error, which is compared with a reference pulse. Thereafter generating applied voltage pulses configured to: switch at each instance of the integrated current error exceeding or becoming less than the reference pulse value; generate a motor current sufficient to achieve a desired speed according to a pre-determined speed input; and having substantially zero average variation from the reference current.

24 Claims, 4 Drawing Sheets

METHOD AND APPARATUS FOR DRIVING A BRUSHLESS DIRECT CURRENT MOTOR

BACKGROUND

The present invention generally relates to DC motors and more specifically to methods and apparatuses for driving brushless DC motors.

Modern appliances, such as HVAC systems, refrigerators and the like, typically include a number of devices controlled by brushless DC motors. A few examples of such devices includes fans for circulating air in a space, evaporator fans among others. Methods for driving the brushless DC motors include simple square wave control and other such methods, which typically generate a pulsating torque, and also a substantial negative torque. Such torque patterns generally result in large torque ripples, which typically excite mechanical resonance of motor housings and mechanically associated structures. This results in an undesirable audible noise and also leads to undesirable mechanical stresses in the motor components. The noise is particularly undesirable in air conditioning environments of homes, workplaces, vehicles and the like. Further, due to a negative torque component, average torque developed in the motor is decreased, thereby lowering the motor efficiency.

Accordingly it would be desirable to have methods and apparatuses to reduce the negative torque components and associated torque ripples in brushless DC motors, and thereby leading to less audible noise and vibrations emanating from motors.

SUMMARY

According to an aspect of the present invention, an apparatus for driving a brushless direct current motor includes a commutation circuit coupled to a power supply, a feedback element, an input interface configured for providing at least one of a user determined speed input and a user determined duty cycle input and a control circuit coupled to the commutation circuit, the input interface and the feedback element. The control circuit is configured to receive inputs from the input interface and the feedback element, and generate control signals readable by the commutation circuit, which is configured to generate a pulse width modulation for driving the motor. This pulse width modulation is characterized by a first voltage pulse configured to generate a motor current having a reference current value, which is sufficient to achieve a desired speed according to the pre-determined speed input. The pulse width modulation is further characterized by subsequent pulses of the voltage configured to maintain the motor current within a pre-determined range of the reference current value.

According to another aspect, a method for driving a direct current motor is disclosed, including generating a first voltage pulse in the motor based on a pre-determined speed input and a pre-determined duty cycle. The first voltage pulse generates a motor current of a reference current value sufficient to achieve a desired speed according to the pre-determined speed input. Next, the method includes generating subsequent pulses of the voltage configured to maintain the motor current within a pre-determined range of the reference current value.

According to another aspect, an apparatus for driving a brushless direct current motor includes a commutation circuit coupled to a power supply, a first feedback element, a second feedback element, an input interface configured for providing at least one of a user determined speed input and a user determined duty cycle input and a control circuit coupled to the commutation circuit, the input interface, the first and the second feedback elements. The control circuit is configured to receive inputs from the input interface and the first and second feedback elements, and generates a pulse width modulation for driving the motor. This pulse width modulation is characterized by applied voltage pulses, the applied voltage pulses configured to switch at each instance of the current error integrated over time becoming less than a reference pulse value and the current error integrated over exceeding the reference pulse value. The applied voltage pulses are further configured to generate a motor current sufficient to achieve a desired speed according to a pre-determined speed input, and the generated motor current has a substantially zero average variation from a reference current value.

Another method of driving a direct current motor includes sensing a current in the motor, comparing the current to a reference current value and generating an error signal representing the difference between the reference current value and the current. The error signal is integrated over time to generate an error value, which is compared to a reference pulse. Applied voltage pulses are generated so that pulses switch at each instance of the error value becoming less than the reference pulse value and the error value exceeding the reference pulse value. Also, the applied voltage pulses are configured to generate a motor current sufficient to achieve a desired speed according to a pre-determined speed input, and the motor current generated has a substantially zero average variation from the reference value.

These and other embodiments, aspects, advantages, and salient features of the present invention will become apparent from the following detailed description, the accompanying drawings, and the appended claims.

DETAILED DESCRIPTION

With reference to the following discussion, a single phase brushless direct current (DC) motor is an example of a brushless DC motor in general, and the single phase brushless DC motor has been extensively used for the purpose of this discussion. However, it is appreciated that the invention is not intended to be limited to a particular kind of a motor, and, in fact meant to be applied to brushless DC motors in general.

Figure 1:
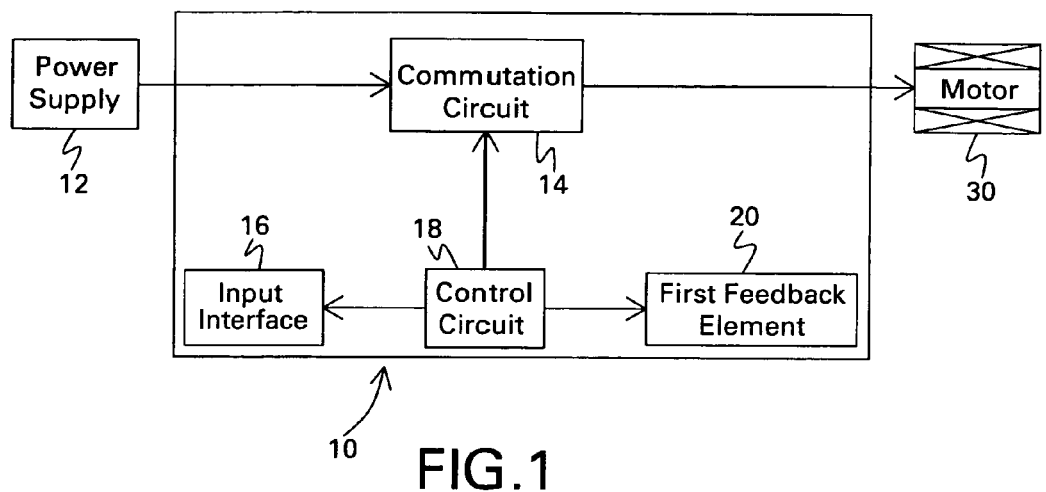
FIG. 1 is a schematic view illustrating an apparatus for driving a motor constructed in accordance with an exemplary embodiment of the invention.

FIG. 1 is a block diagram illustrating an apparatus 10 for driving a motor 30. The apparatus 10 includes a control circuit 18 coupled to a commutation circuit 14, which is in turn coupled to the motor 30. A power supply 12 is coupled to the apparatus, and more specifically to the commutation circuit 14, for providing an input voltage. A feedback element 20, coupled to the motor 30, is further coupled to the control circuit 18. The feedback element 20 is configured to provide a parameter of the motor 30 to the control circuit. An input interface 16 is coupled to the control circuit 18 for providing desired inputs. The input interface may be an interface with a user of the apparatus, for example a switch or a button among others, or may be an interface with an external system (not shown) that provides desired inputs for driving the motor 30.

According to an embodiment, the power supply 12 provides a suitable input voltage (also referred to as $V_M$ for the discussion) for driving the motor 30, to the commutation circuit 14. The control circuit 18 will be generally understood to include a number of components (not illustrated) including a processing module, such as a microprocessor, and a memory module, such as a memory chip. The processing module is configured for processing input data to generate output control signals, and the memory module configured for locally storing the input or the output data. More specifically, the control circuit is configured to generate specific control signals based on criterions for the commutation circuit 14, which is configured to receive such control signals to provide switching of the input voltage to the motor 30. The commutation circuit 14 includes switching elements, and is generally configured to provide pulse width modulation of the input voltage received from the power supply 12 based on the control signals from the control circuit 18. According to an embodiment, the feedback element 20 is a rotor position sensor, and provides a rotor position input to the control circuit 18. According to an aspect of the invention, the input interface 16 provides a pre-determined duty cycle (for example 0.3, 0.5, 0.7 or High, Medium, Low) and a pre-determined motor speed input (for example High, Medium or Low, or 300 rpm, 450 rpm, 600 rpm) from a user or an external system (not shown). It will be appreciated that duty cycle and motor speed are just examples of the inputs, and not meant to limit the kind of inputs.

Figure 2:
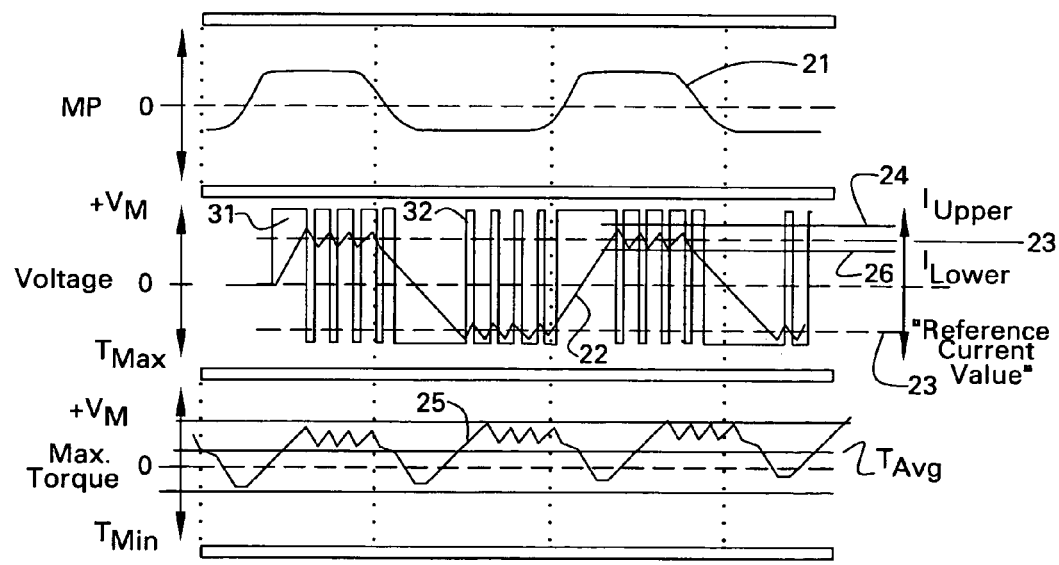
FIG. 2 illustrates a waveform diagram of the apparatus of FIG. 1.

FIG. 2 illustrates waveform diagrams of various motor parameters, including EMF 21, applied first and subsequent voltage pulses 31, 32, motor current 22 and torque generated 25, illustrating a method of driving the motor 30 for the apparatus 10 of FIG. 1. According to an embodiment, the method reduces the torque ripple in the motor by generating a nearly constant motor current. A more specific embodiment of the method includes generating a first voltage pulse 31 provided to the motor 30. The first voltage pulse 31 generates a motor current 22 of a reference current value 23 to achieve a desired speed according to the pre-determined speed input. Thereafter, the method includes generating subsequent pulses 32 of the voltage configured to maintain the motor current 22 within a pre-determined range of the reference current value 23.

The first and subsequent pulses 31, 32 are configured to be switched to preserve the continuity of motion in the motor 30. As used herein, the term "switching", "switched", "switch" in the context of pulses will be understood to refer to either changing a voltage pulse state between ON and OFF or reversing the polarity of the voltage pulse. In particular, the pulse voltage polarity is reversed at each commutation instance of the motor. Further, for the purpose of decreasing or increasing the motor current, the voltage pulse is switched OFF (from an ON state) or ON (from an OFF state) or the voltage pulse is reversed in polarity from its previous state.

Figure 3:
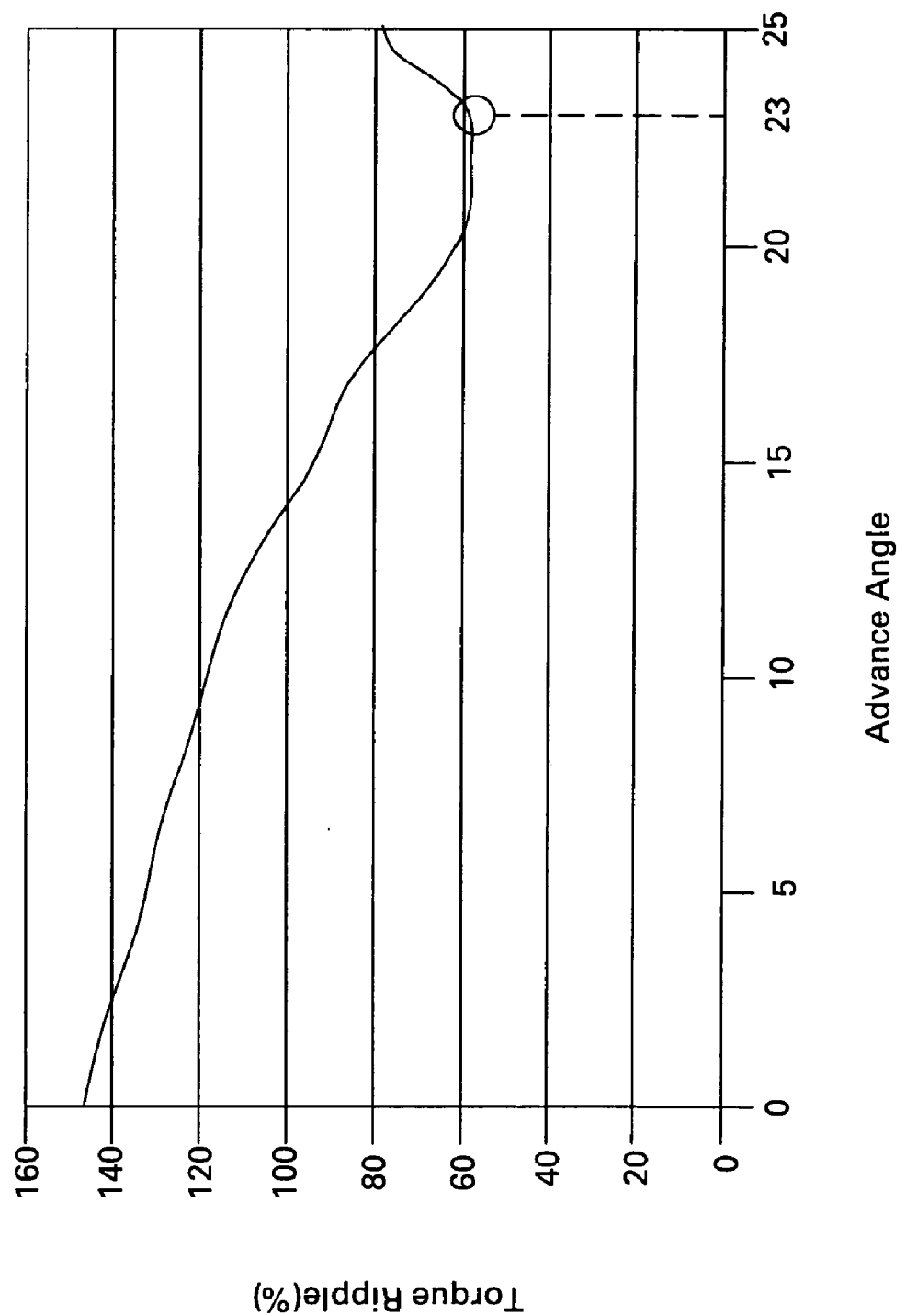
FIG. 3 is a torque ripple versus advance angle graph illustrating the determination of a switching advancing angle in accordance with an aspect of the invention.

As is appreciated from FIG. 2, the motor current 22 reaches the reference current value 23 on application of the first voltage pulse 31. The subsequent pulses 32 preserve the motor current 22 within a predetermined range. Further at the commutation instance, indicated by the EMF 21 becoming zero, the voltage pulses are switched in polarity, and accordingly the motor current also reverses in direction, providing a continuous motion in the motor. A decreased torque ripple is indicated by the torque 25 waveform as shown in FIG. 2. According to a related embodiment, switching advancing may be advantageously used to reduce torque ripple in the motor. The switching may be advanced by a suitable phase angle relative to the EMF 21. The suitable advancing phase angle for a given duty cycle can be determined from the study of a plot of the torque ripple versus the advance angle, as shown in FIG. 3. An approximate optimal value of the advancing angle is selected, which takes into account the feasible physical placement of the rotor position sensor in the motor.

According to a more specific embodiment, the range of reference current value 23 may be arrived at by determining a lower 26 and an upper 24 magnitude limit. The lower magnitude limit 26 may be set between 80 and 100 percent of the reference current value 23, and the upper magnitude limit 24 may be set between 100 and 120 percent of the reference current value 23. It is appreciated that though the range set with lower magnitude limit within 80–100 percent and upper magnitude limit within 100–120 percent of the reference current value provides desired results, the method can be applied to ranges beyond 80 percent for lower magnitude limit and 120 percent for upper magnitude limit, with varied results, and lie within the scope of the disclosed embodiments. Further, a duty cycle (different from the pre-determined duty cycle) of the subsequent pulses 32 is determined based upon the lower and upper magnitude limits, the pre-determined speed input, the motor reference current value and an electric time constant of the motor. According to an embodiment the duty cycle of subsequent pulses 32 is calculated based on solving the fundamental differential equation:

$$V_M \cdot \dot{u} = i \cdot R + L\frac{di}{dt} + EMF_{motor}$$

where $\dot{u}$ is ECM drive circuit switching vector of either (1, −1) or (1, 0), reversing the polarity, or toggling between ON and OFF, respectively as switching state; $V_M$ is the input voltage supplied to the motor; i is the motor current; R is the motor circuit resistance; L is the motor inductance; and $EMF_{motor}$ is the EMF generated in the motor. However, other approaches for determining the switching instances for the subsequent pulses 32 are also possible, and as such are included within the scope of maintaining the motor current within a range of the reference motor current 23.

According to the FIGS. 1–3 embodiments, methods and apparatus as discussed above advantageously deliver a substantially constant current to the motor 30, reduce the peak value of the torque developed, and reduce the associated torque ripple.

Figure 4:
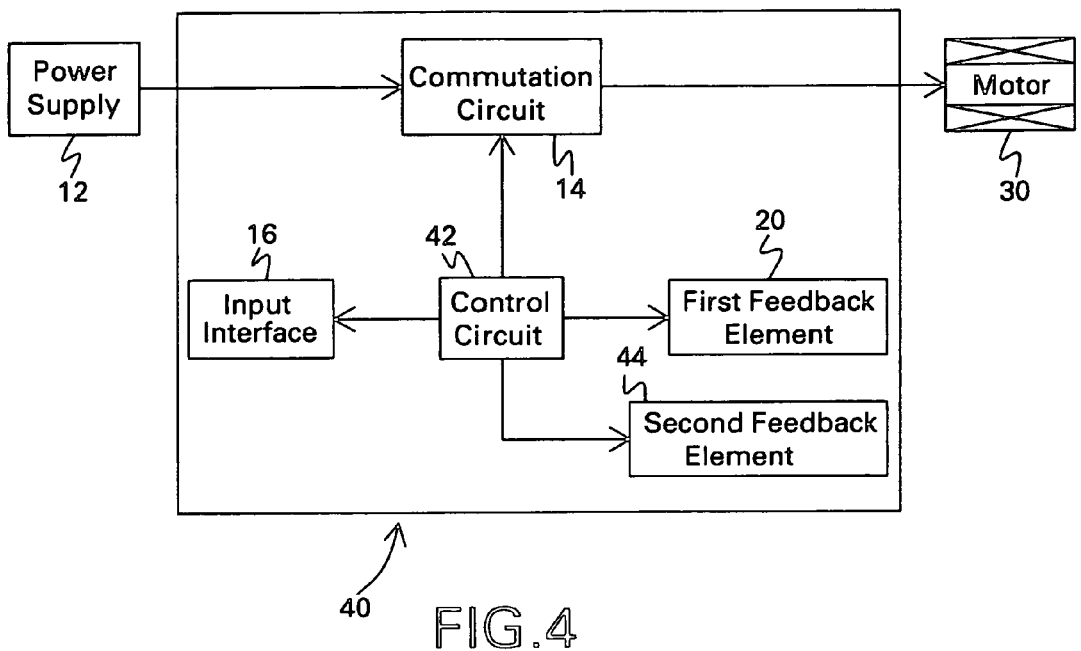
FIG. 4 is a schematic view illustrating another exemplary embodiment of an apparatus for driving a motor.

FIG. 4 is a block diagram illustrating an apparatus 40 for driving a motor 30, according to another disclosed embodiment. The apparatus 40 includes a control circuit 42 coupled to a commutation circuit 14, which is in turn coupled to the motor 30. A power supply 12 is coupled to the apparatus, and more specifically to the commutation circuit 14, for providing an input voltage. A first feedback element 20 and a second feedback element 44 are coupled to the motor 30, and the feedback elements are further coupled to the control circuit 42. The feedback elements 20, 44 are configured to provide parameters of the motor 30 to the control circuit 42. An input interface 16 is couple to the control circuit 42 for providing desired inputs, and the input interface may be an interface with a user of the apparatus, for example switches, buttons among others, or may be an interface with an external system (not shown) that provides pre-determined inputs for driving the motor 30.

According to an embodiment, the power supply 12 provides a suitable input voltage for driving the motor 30, to the commutation circuit 14. The control circuit 42 will be generally understood to include a number of components (not illustrated) including processing module, such as a microprocessor, and a memory module, such as a memory chip, the processing module configured for processing input data to generate output control signals, and the memory module configured for locally storing the input or the output data. The commutation circuit 14 includes switching elements, and is generally configured to provide pulse width modulation of the input voltage received from the power supply 12, based on the control signals from the control circuit 42. The first feedback element 20 may be a rotor position sensor that provides a rotor position input to the control circuit 42. The second feedback element 44 may be a current sensor, which senses a motor current 22 and provides the input to the control module 42. The input interface 16 provides a pre-determined duty cycle (for example 0.3, 0.5, 0.7 or High, Medium, Low) and a pre-determined motor speed input (for example High, Medium or Low, or 300 rpm, 450 rpm, 600 rpm) such as that desired by a user or an external system (not shown). It will be appreciated that duty cycle and motor speed are just examples of the inputs, and not meant to limit the kind of inputs.

Figure 5:
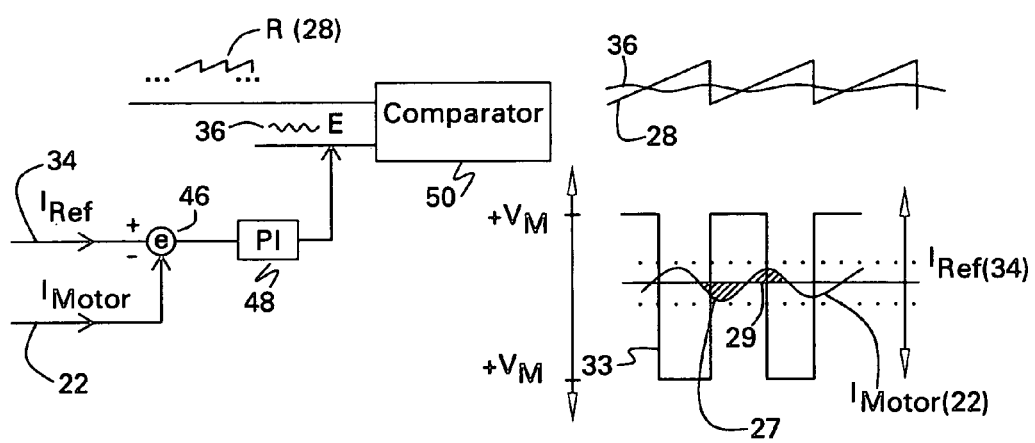
FIG. 5 is a schematic view illustrating the control circuit of the apparatus of FIG. 4.

FIG. 5 is a schematic of a portion of the control circuit 42 and associated waveform diagrams, illustrating a method of driving the motor 30, for the apparatus 40 of FIG. 4. An error calculator 46 calculates a current error between two values of input current signals. In an embodiment, the error calculator 46 is coupled to the current sensor 44, and configured to receive the motor current 22 value, and a pre-determined reference current 34 value, as inputs, and generates a current error 35. The error calculator 46 is coupled to a proportional integrator 48 operational to provide an integrated signal over time, such as a current error integrated over time 36. The proportional integrator 48 is operatively coupled to a comparator 50 that compares the magnitudes of at least two inputs, the comparator 50 further coupled to a constant frequency reference pulse 28 input. As illustrated in FIG. 5, the pulse 28 is a saw-tooth pulse. According to this embodiment, the comparator 50 is configured to provide a switching signal whenever the current error integrated over time 36 exceeds or becomes less than the saw-tooth reference pulse 28.

Figure 6:
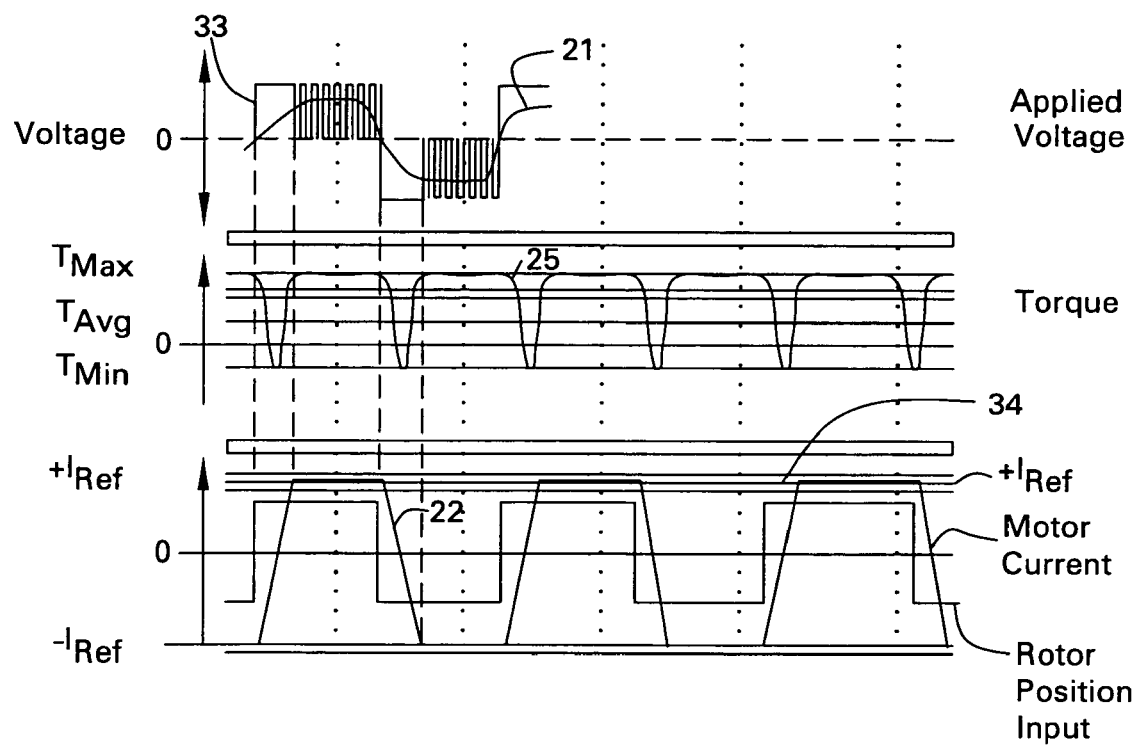
FIG. 6 is a waveform diagram of the apparatus of FIG. 4.

FIG. 6 shows waveform diagrams of various motor parameters, such as torque 25, EMF 21, current 22 and applied voltage pulses 33, further illustrating the method of driving the motor 30 for the apparatus 40 of FIG. 4. According to an embodiment, the method reduces the torque ripple in the motor by generating a nearly constant motor current in steady state, with a nearly average zero variation from a reference current value 34. In a more specific embodiment, and with reference to FIGS. 4–6, the motor current sensor 44 provides the motor current 22 value at an instance, which is compared with the reference current value 34, and a difference between the reference current value 34 and the motor current 22 at an instance is calculated. For example, the error calculator 46 calculates the difference between the two values, also referred to as a current error 35. The current error 35 is integrated over time, by a suitable component, such as a proportional integrator 48 as described above or any other suitable component known in the art, to generate a current error integrated over time 36, also denoted by the letter E in FIG. 5. The current error integrated over time 36 and the reference pulse 28, for example the saw-tooth pulse discussed above, are compared by the comparator 50 configured to indicate, through an electronic signal, when the error value 36 integrated over time exceeds the reference pulse 28 or the current error integrated over time 36 becomes less than the reference pulse 28. In an embodiment the comparator 50 may be configured to generate a switching signal when the current error integrated over time 36 exceeds the reference pulse 28 or the current error integrated over time 36 becomes less than the reference pulse 28. It is appreciated that switching the voltage pulses in the manner as described above, cause the motor current 22 to oscillate about the reference current value 34, in steady state. It is appreciated here that the term "oscillate" is not intended to indicate a sinusoidal variation, but a rise and fall pattern of the motor current, in general. The motor current 22 oscillates so that the error in the motor current, from the reference value, integrated over time, has a zero average. This is also illustrated by the waveform of FIG. 5, where a first negative current value integrated over time 27 and a second positive current value integrated over time 29 are representative of multiple such current pockets, and the sum average of these pockets is zero, or nearly zero in the steady state operation of the motor.

As is appreciated from FIG. 6, at the commutation instance, indicated by the EMF becoming zero, the voltage pulses are switched in polarity, and accordingly the motor current also reverses (or begins to reverse) in direction, providing a substantially continuous motion in the motor. A corresponding torque ripple is indicated by the torque 25 waveform as shown in FIG. 6, and it is appreciated that the methods and systems discussed with reference to FIGS. 4–6 advantageously reduce the torque ripple by maintaining a nearly constant current with a current variation from a reference value having nearly zero sum average.

According to a related embodiment, switching advancing may be advantageously used to reduce instances of torque ripple in the motor. The switching may be advanced by a suitable phase angle relative to the EMF 21, and determining the suitable phase angle has been discussed earlier with reference to FIG. 3. It is also appreciated here that the reference pulse 28 is configured to provide a selectable frequency. In an embodiment, the frequency of the reference pulse 28 governs the frequency of the applied voltage pulses 33. Accordingly, a desired granularity of change in current direction can be established as per operational requirements of the motor, by selecting an appropriate reference pulse frequency.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus for driving a brushless direct current motor, comprising:
   a commutation circuit coupled to a power supply;
   a feedback element;
   an input interface configured for providing at least a user determined speed input; and
   a control circuit coupled to the commutation circuit, the input interface and the feedback element, wherein the control circuit is configured to receive inputs from the input interface and the feedback element, and generate control signals readable by the commutation circuit, the commutation circuit configured to generate a pulse width modulation for driving the motor, the pulse width modulation comprising:
      a first voltage pulse configured to generate a motor current of a reference current value sufficient to achieve a desired speed according to the user determined speed input; and
      subsequent pulses of the voltage configured to maintain the motor current substantially within a determined range of the reference current value.

2. The apparatus of claim 1, wherein the feedback element is a rotor position sensor.

3. The apparatus of claim 1, wherein the motor Is a single phase brushless DC motor comprising at least one winding.

4. A method for driving a brushless direct current motor, comprising:
   generating a first voltage pulse In the motor based on a user determined speed input and a determined duty cycle, wherein the first voltage pulse generates a motor current of a reference current value sufficient to achieve a desired speed according to the user determined speed input;
   receiving a feedback signal representative of a difference between the reference current value and the motor current; and
   generating subsequent pulses of the voltage based at least in cart upon the feedback signal, the subsequent pulses configured to maintain the motor current substantially within a determined range of the reference current value.

5. The method of claim 4, further comprising switching the first and the subsequent voltage pulses either ON or OFF, or reversing the polarity of the first and the subsequent pulses.

6. The method of claim 5, further comprising generating a plurality of switched first pulse and subsequent pulses.

7. The method of claim 6, further comprising:
   providing a rotor position input; and
   reversing the voltage polarity based on the rotor position input.

8. The method of claim 7, wherein the switching of the first pulse and the subsequent pulses is advanced by a phase angle relative to an EMP generated in the motor.

9. The method of claim 7, wherein the range of the reference current value comprises a lower magnitude limit between 80–100 percent of the reference current value and an upper magnitude limit between 100–120 percent of the reference current value.

10. The method of claim 9, wherein the switching of subsequent pulses of the voltage is based on an electrical time constant of the motor, the user determined speed input and the lower and upper magnitude limits.

11. The method of claim 10, wherein a duty cycle of the subsequent pulses, different from the determined duty cycle, is configured to be based on the user determined speed input.

12. The method of claim 11, wherein a frequency of the switching of the subsequent pulses is based on the duty cycle of the subsequent pulses and the upper and lower magnitude limits.

13. The method of claim 12, wherein the frequency of the switching of the subsequent pulses is further based on the determined duty cycle.

14. An apparatus for driving a brushless direct current motor, comprising:
   a commutation circuit coupled to a power supply;
   a first feedback element;
   a second feedback element;
   an input interface configured for providing at least a user determined speed input; and
   a control circuit coupled to the commutation circuit, the input interface, the first and the second feedback elements, wherein the control circuit is configured to receive inputs from the input interface and the first and second feedback elements, and wherein the control circuit generates a pulse width modulation for driving the motor, the pulse width modulation comprising:
      generating applied voltage pulses, the applied voltage pulses configured to switch at each instance of a current error integrated over time becoming less than a reference pulse value and the current error integrated over exceeding the reference pulse value, and the applied voltage pulses further configured to generate a motor current sufficient to achieve a desired speed according to a user determined speed input wherein the generated motor current has a substantially zero average variation from a reference current value.

15. The apparatus of claim 14, wherein the control circuit further comprises:
   an error calculator;
   a proportional integrator; and
   a comparator.

16. The apparatus of claim 15, wherein the motor is a single phase brushless DC motor comprising at least one winding.

17. The apparatus of claim 16, wherein the first feedback element is a rotor position sensor and the second feedback element is a motor current sensor.

18. A method of driving a brushless direct current motor, comprising:
   sensing a current in the motor;
   comparing the motor current to a reference current value;
   generating an error signal representing the difference between the reference current value and the motor current;
   integrating the error signal over time to generate a current error integrated over time;
   comparing the current error integrated over time with a reference pulse; and
   generating applied voltage pulses, the applied voltage pulses configured to switch at each instance of the current error integrated over time becoming less than the reference pulse value and the current error integrated over time exceeding the reference pulse value, and the applied voltage pulses further configured to generate a motor current sufficient to achieve a desired speed according to a user determined speed input, wherein the generated motor current has a substantially zero average variation from the reference current value.

19. The method of claim 18, further comprising:
providing a rotor position input and
reversing the voltage polarity based on the rotor position input.

20. The method of claim 18, wherein switching the applied voltage pulses comprises switching the applied voltage pulses either ON or OFF, or reversing the polarity of the applied voltage pulses.

21. The method of claim 20, further comprising generating a plurality of applied voltage pulses.

22. The method of claim 20, wherein the switching of the applied voltage pulses is configured to be advanced by a phase angle relative to an EMF generated in the motor.

23. The method of claim 18, wherein the applied voltage pulses are further characterized by a selectable fixed frequency.

24. The method of claim 23, wherein the selectable fixed frequency is the frequency of the reference pulse.

* * * * *